May 14, 1968 C. M. ALSYS ETAL 3,383,222
SHIRRED SAUSAGE CASING HAVING COMPRESSED PLUG END CLOSURE
Filed Dec. 16, 1964 2 Sheets-Sheet 1

CLARENCE M. ALSYS
SIDNEY B. CLARK
JOHN I. RISVOLD
GEORGE M. WILMSEN
*INVENTOR.*

BY
THEIR ATTORNEY

May 14, 1968     C. M. ALSYS ETAL     3,383,222

SHIRRED SAUSAGE CASING HAVING COMPRESSED PLUG END CLOSURE

Filed Dec. 16, 1964     2 Sheets-Sheet 2

CLARENCE M. ALSYS
SIDNEY B. CLARK
JOHN I. RISVOLD
GEORGE M. WILMSEN
*INVENTOR.*

BY
THEIR ATTORNEY

United States Patent Office 3,383,222
Patented May 14, 1968

3,383,222
SHIRRED SAUSAGE CASING HAVING
COMPRESSED PLUG END CLOSURE
Clarence M. Alsys, Sidney B. Clark, John I. Risvold, and
George M. Wilmsen, Danville, Ill., assignors to Tee-Pak, Inc., Chicago, Ill., a corporation of Illinois
Filed Dec. 16, 1964, Ser. No. 418,777
3 Claims. (Cl. 99—176)

ABSTRACT OF THE DISCLOSURE

A shirred synthetic sausage casing is provided with an end closure by turning a portion of the end of the casing into the bore of the casing and then compressing the inturned casing material in the opposite direction against a fixed surface to form a plug of compressed casing material forming a closure which prevents the ejection of meat during stuffing but which is easily stripped on conclusion of stuffing and linking of the casing.

---

Figure 1:
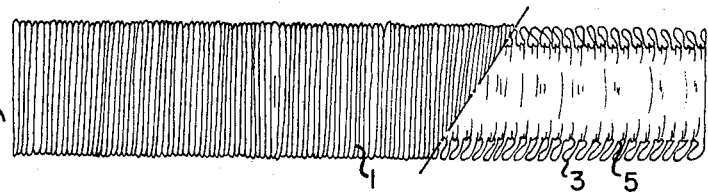

This invention relates to new and useful improvements in shirred synthetic sausage casings and more particularly to the closure of the end of a shirred sausage casing.

Artificial tubular casings, particularly sausage casings formed of regenerated cellulose, are prepared as hollow, thin-walled tubes of very great length. For convenience in handling and in filling, these casings are shirred from lengths ranging from 40 to 160 feet or more down to a shirred and compressed length of the order of a few inches.

An early type of shirring machine and the resulting shirred product are shown in Dietrich U.S. Patent 2,010,626. Improved forms of shirring machines and the shirred products produced on such machines are shown in Korsgaard U.S. Patent 2,583,654; Blizzard et al. U.S. Patents 2,722,714, 2,722,715, and 2,723,201; Gimbel U.S. Patent 2,819,488; and Matecki U.S. Patents 2,983,949 and 2,984,574.

After a casing is shirred, it is packaged and shipped to a meat packing house where an individual shirred strand is placed on a stuffing horn and a meat emulsion extruded to fill the casing to its fully extended length. The stuffing of the casing usually takes place within a few seconds with the result that the casing is extended from a shirred length of about 8 to 27 inches to an extended length of 40 to 160 feet or more in a matter of 3 to 12 seconds. This rapid extension of the casing during stuffing requires that the casing be especially strong and resistant to tearing.

Recently, machines have been developed for automatic stuffing of sausage casings with sausage meat emulsion, and machines have been known for several years for automatic linking of sausages and stripping of casings therefrom. Townsend U.S. Patent 3,115,668 discloses a radically new machine which stuffs and links automatically.

The Townsend machine stuffs a shirred casing with sausage meat emulsion and forms the stuffed casing into sausage links for further processing.

In automatic sausage stuffing machines of all types, and in the Townsend machine in particular, there is a need for a shirred casing having an end closure so that the shirred strand of casing can be placed on the stuffing horn and filled with sausage emulsion without further action by the stuffing machine operator. In the past, it has been necessary for the stuffing machine operator to close the end of the casing in some manner, or to hold it closed manually until sufficient sausage emulsion had been extruded into the end of the casing to restrict further flow of the meat emulsion out of the casing. The open end of a strand of shirred casing cannot be closed by a metal clip or staple since the meat which is recovered and reprocessed from the casing end portions do not fill out sufficiently to make complete sausages. If metal clips or staples were used to close the end of casings, there would be danger of such pieces of metal finding their way into their sausages made from the meat in said end portions.

Recently, attempts have been made to close the ends of casings by various techniques involving twisting or knotting of the casing material. In some cases, the closure formed from the casing material has been of insufficient strength to prevent blowout of the end under pressure of the sausage emulsion. In other cases, the end closure has been so strong and tight as to resist stripping of meat emulsion from the end portions of the casing for recovery of the meat in said end portions. There has been a considerable demand for a shirred sausage casing having an end closure formed of the material in the casing and which maintains a proper balance between resistance to blowout by the meat emulsion and ease of stripping of sausage emulsion from the end portions of the casing.

Accordingly, it is one object of this invention to provide a new and improved method of closing an end of a shirred strand of tubular casing.

Another object of this invention is to provide an improved method for closing the end of a shirred strand of sausage casing utilizing only the material of the casing in forming the closure.

Still another object of this invention is to provide a new and improved shirred strand of tubular casing having a novel end closure formed from material in the casing.

A feature of this invention is the provision of an improved method for closing one end of a shirred strand of tubular casing by forming a compressed plug of casing material within the end portion of the casing.

Another feature of this invention is the provision of an improved shirred strand of tubular casing having an end closure formed of a compressed plug of casing material positioned within the end of the casing.

Other objects and features of this invention will become apparent from time to time throughout the specification and claims as hereinafter related.

Summary of the invention

This invention is based upon our discovery of a new and improved method for closing the ends of shirred strands of synthetic tubular casing and the improved product produced thereby. We have found that a shirred strand of tubular casing can be closed effectively by pulling a tab of casing at one end of the strand lateral to and closing said one end. A plunger is then inserted against the material of said tab to cause said material to be inverted into the end of the casing. The plunger is then withdrawn from that end of the casing. Next, the casing is placed against a surface and another plunger introduced into the opposite end of the strand to engage and compress the inverted casing portion against said surface. By this method, a compressed plug of casing is formed in the end of the casing and closing the end thereof. This closure plug is sufficiently tight to resist blowout by sausage emulsion during stuffing of the casing and yet is easily stripped free of excess sausage emulsion after the casing is filled and linked.

In the accompanying drawings, to be taken as a part of this specification, there is shown an improved method for closing the end of a shirred strand of tubular casing in accordance with this invention. The drawings are partially in elevation and partially in section. The shirred casings are of a film material which is so thin that it is impractical to show any thickness to the material in the views which are in section.

Figure 2:
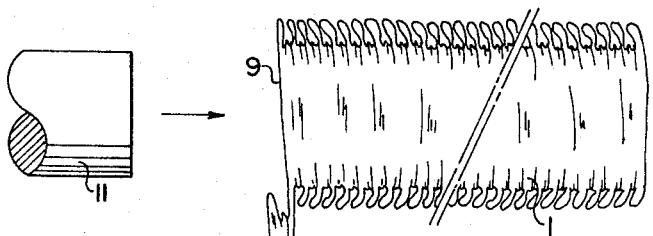
Figure 3:
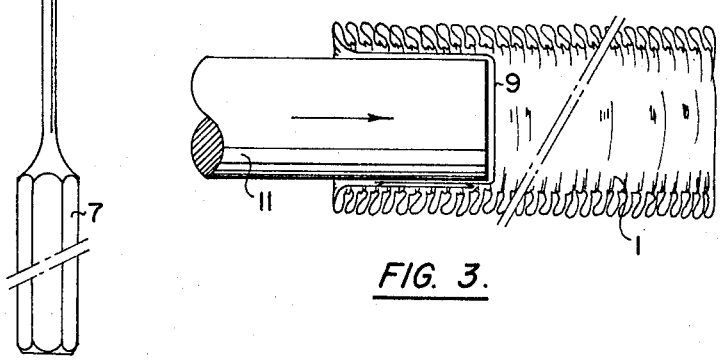
Figure 4:
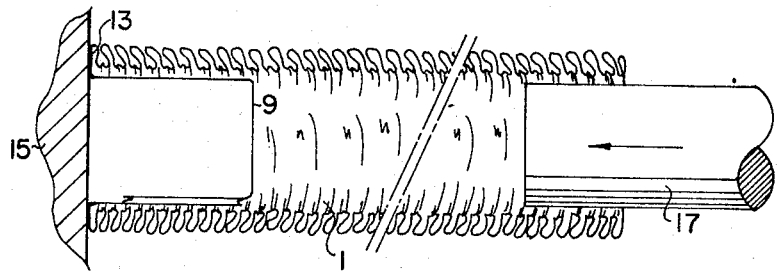
Figure 5:
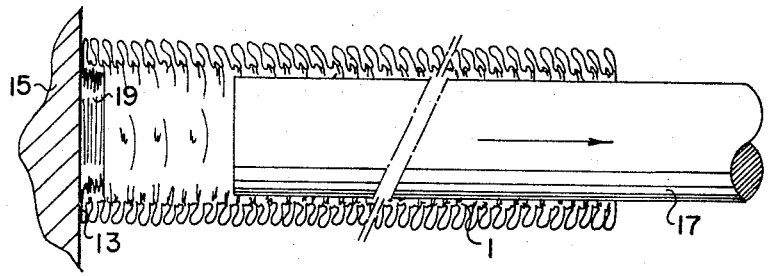
Figure 6:
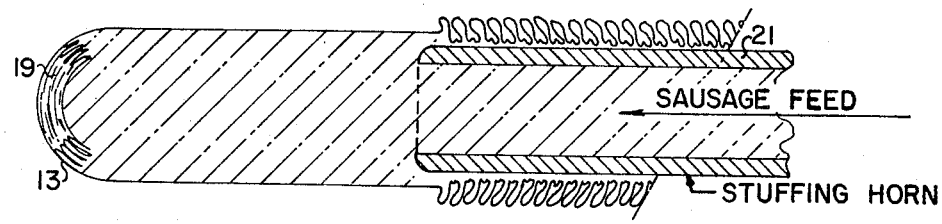

FIG. 1 is a view partially in elevation and partially in section of a strand of shirred tubular casing and showing a tabbing tool in juxtaposition to one end, FIG. 2 is a view of the casing as shown in FIG. 1 with the tabbing tool moved to a position forming a tab closing one end and with a plunger in position to move against said tab, FIG. 3 is a view of the casing showing the plunger moved to a position inverting a portion of casing within the end portion of the strand, FIG. 4 is a view of the casing with the first plunger removed and positioned against a surface against which a plug of casing material is formed by engagement of a second plunger, FIG. 5 is a view of the casing after the plug closure is formed and the forming plunger is partially removed, and FIG. 6 is a view in section showing the shirred strand of casing with end closure as formed in accordance with this invention placed on a stuffing horn to be filled with sausage emulsion.

Referring to the drawings by numerals of reference and more particularly to FIG. 1, there is shown a shirred strand of tubular casing 1 having a plurality of circumferentially disposed major pleats 3 and minor pleats 5. The casing 1 is preferably a tubular regenerated cellulose casing of the type used in the preparation of sausages (primarily wiener sausages). This invention, however, is applicable to any shirred tubular material, such as tubular films of amylose, starch, polyvinyl alcohol, alginates, cellulose derivatives, gelatin, collagen, casein, zein, or plastic films including polystyrene, polyvinyl chloride, saran, polyethylene, polypropylene, polyesters, nylon, etc.

The plastic films just mentioned are not customarily used in the preparation of sausages but are useful for packaging other materials and, therefore, can be used in the method of this invention.

In a preferred method of this invention, as shown in FIGS. 1 to 5, the end of the shirred casing strand is closed by first engaging a hook-like tool 7 with an end portion of the casing material as shown in FIG. 1. The hook-shaped tool is pulled laterally to form tab 9 closing the end of the strand temporarily. After the tab 9 is formed across the end of casing strand 1, plunger 11 is moved toward the tab as shown in FIG. 2.

In FIG. 3, plunger 11 is shown moved to a position in which tab 9 is completely inverted within the end portion of the strand.

Next, plunger 11 is withdrawn from the end portion of strand 1 and the strand is placed with the end portion 13 into which tab 9 was inverted against a fixed surface shown diagrammatically as 15. A second plunger 17 is then moved into the opposite end of the strand as shown in FIG. 4. Plungers 11 and 17 may be of any suitable size but are preferably not less than one-half the diameter of the bore of the strand.

Plunger 17 is moved through strand 1 against the inverted tab portion 9 to compress a relatively thin plug of material 19 against fixed surface 15 as shown in FIG. 5. Plunger 17 is then withdrawn from the casing as shown in FIG. 5, and the casing is then ready for storage and shipment to the meat packer. The plug 19 of casing material formed within the casing end portion 13 extends substantially across the bore of the strand and is sufficiently tight to prevent blowout during filling with sausage emulsion but can be easily stripped of excess sausage emulsion after linking of the sausages.

In FIG. 6, the casing is shown in position on a stuffing horn at the time of stuffing with sausage emulsion. When a shirred strand of casing having a compressed plug closure as shown in FIG. 5 is placed on stuffing horn 21 and filled with sausage as indicated by the directional arrow in FIG. 6, the casing is filled with sausage emulsion and extended from a shirred length of a few inches to a filled length of 40 to 160 feet or more in a matter of a few seconds. In FIG. 6, the casing is shown as it is initially feeding off of a stuffing horn and filled with sausage emulsion. The sausage emulsion fills the casing substantially to its end and the pressure of meat is not sufficient to blow out the end closure.

In the description of forming a plug closure within the end of the casing, the use of a hook-shaped tool for forming a tab closure was described. It should be noted that any suitable means can be used for forming a preliminary closure in the end of the casing before plunger 11 is used to form the inverted tab of material as shown in FIG. 3. For example, a tab could be formed by hand, or the end of the casing could be closed by formation of a loose twist or knot in the material before it is engaged by plunger 11 and subsequently formed by plunger 17 into a plug 19 as described.

While this invention has been described with special emphasis upon one preferred embodiment, we wish it to be understood that within the scope of the appended claims the invention may be practiced otherwise than as specifically described herein.

What is claimed is:

1. A method of closing an end of a shirred strand of synthetic tubular casing which comprises inverting a portion of the casing into one end of the strand, placing the strand against a relatively fixed surface, and compressing the inverted portion in the opposite direction against said relatively fixed surface to form a compressed plug of casing positioned within the end of the casing and closing the end thereof.

2. A method as defined in claim 1 in which a tab of casing at one end of the strand is pulled lateral to and closing said one end and a plunger inserted into said one end engaging said tab to invert a portion of the casing into said one end, withdrawing said plunger from said one end, placing said one end against a relatively fixed surface, and inserting a plunger into the opposite end of said strand to engage and compress said inverted casing portion against said relatively fixed surface to form a compressed plug of casing within the bore of the strand and closing the end thereof.

3. A shirred strand of synthetic tubular casing having an end closure within the end of the strand prepared in accordance with claim 1.

References Cited

UNITED STATES PATENTS 3,274,005  9/1966  Alsys _____ 99—176

OTHER REFERENCES

"The National Provisioner," Feb. 29, 1964, p. 15.

HYMAN LORD, *Primary Examiner.*